G. E. BATES.
DIRECTION INDICATOR FOR VEHICLES.
APPLICATION FILED AUG. 10, 1920.

1,407,831.

Patented Feb. 28, 1922.
2 SHEETS—SHEET 1.

George E. Bates — INVENTOR.

BY

Parsons & Bordell — ATTORNEYS.

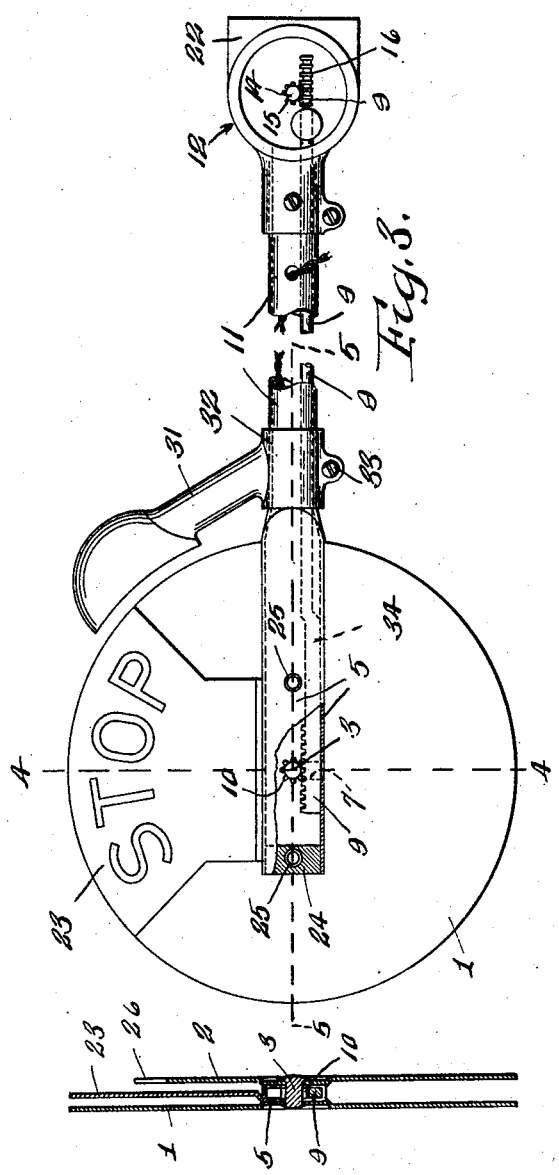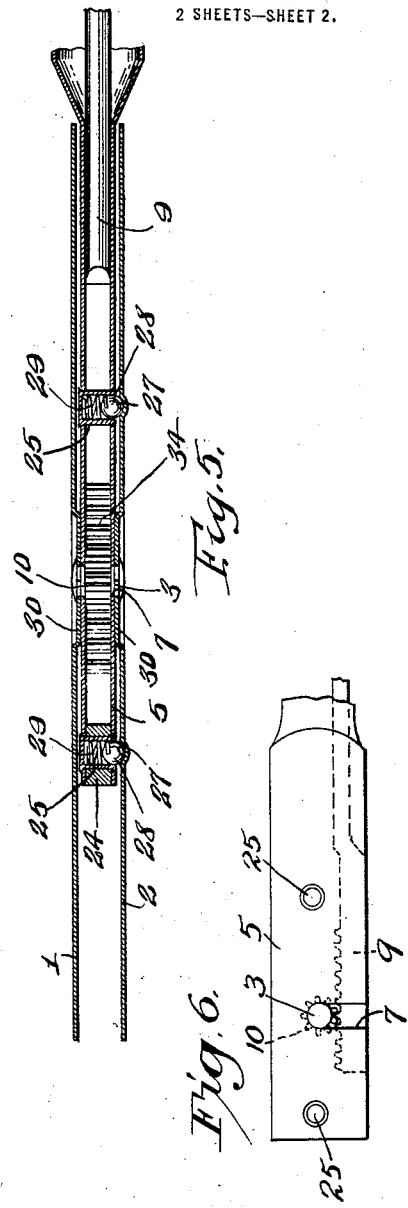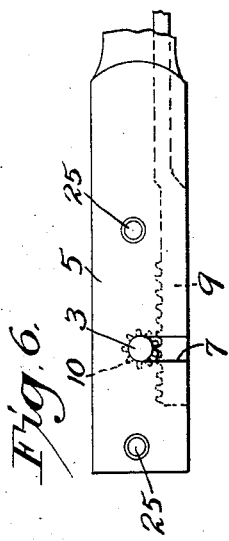

UNITED STATES PATENT OFFICE.

GEORGE E. BATES, OF SYRACUSE, NEW YORK.

DIRECTION INDICATOR FOR VEHICLES.

1,407,831.  Specification of Letters Patent.  Patented Feb. 28, 1922.

Application filed August 10, 1920. Serial No. 402,616.

*To all whom it may concern:*

Be it known that I, GEORGE E. BATES, a citizen of the United States, and a resident of Syracuse, in the county of Onondaga and State of New York, have invented a certain new and useful Direction Indicator for Vehicles, of which the following is a specification.

This invention relates to direction indicators of the class set forth in my pending application, Sr. No. 279,934, filed March 1, 1919, and has for its object a construction and grouping of the parts by which they can be readily assembled in a permanent unitary structure. The invention consists in the novel features and in the combinations and constructions hereinafter set forth and claimed.

In describing this invention, reference is had to the accompanying drawings in which like characters designate corresponding parts in all the views.

Figure 3 is a rear elevation, partly broken away and parts as the rear indicator disk being removed.

Figure 1:
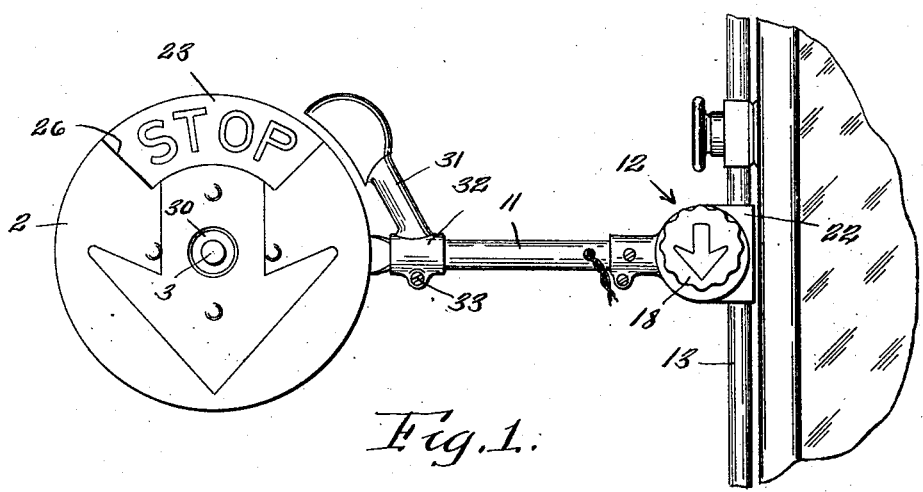
Figure 1 is a rear elevation of this direction indicator, the contiguous part of a motor vehicle, as the windshield to which the direction indicator is attached, being also shown.
Figure 2:
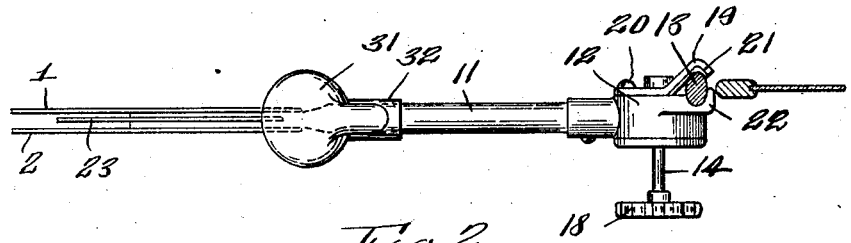
Figure 2 is a plan view of parts seen in Fig. 1.

Figures 4 and 5 are sectional views taken respectively, on lines 4—4, and 5—5, Fig. 3.

Fig. 6 is an enlarged fragmentary view of the support for the axle of the indicators.

This invention comprises front and rear indicator plates, an axle on which the plates are mounted, a support located between the plates and formed with a slot open at one end for receiving the axle, means extending across the open end of the slot to hold the axle from displacement, this means also being connected to the axle to rotate the same.

The indicators and their axle constitute one unit and the support another unit which are assembled by placing the axle in the slot and then closing the open end slot by means for actuating the axle.

The indicator plates 1, 2 are here shown as sheet metal disks having on their outer faces, indicating characters as arrows, the plates forming a background against which the arrows are visible in all lights and positions of the observer. These disks or plates are substantially as shown and described in my Patents Nos. 1,343,994, issued June 22, 1920, direction indicator for vehicles; 1,355,528, issued Oct 12, 1920, direction indicator for motor vehicles; and 1,364,172, issued Jan. 4, 1921, direction indicator for motor vehicles.

3 designates the axle on which the disks 1, 2 are fixedly mounted, the disks having openings for receiving the axle and the ends of the axle being riveted or spun onto the outer faces of the disks to secure the disk to the axle, thus the disks and the axle are in the general form of a short bobbin or reel with relatively large heads.

5 is the support which is in the form of a hollow flattened box or housing. The flattened box like housing is also formed with an open ended slot 7 extending inwardly from the lower side thereof, this slot being the result of alined vertical slots formed in the front and rear sides, and a transverse slot in the bottom wall of the housing. The slot 7 receives the intermediate part of the axle 3 which is placeable in the slot through the lower open end thereof, and the axle is held in position by a member extending into the housing through the shank thereof and across the open end of the slot 7. This member also coacts with the axle to rotate the same to change the positions of the indicator plates 1, 2 and hence the arrows thereof. As here shown, this member is an endwisely movable rod 9 having a rack meshing with gear teeth 10 provided on the intermediate part of the axle 3. This rod extends through a hollow arm 11 secured to a housing 12 connected to the windshield iron 13 in any suitable manner, and in which housing is journaled a shaft 14 having a pinion 15 meshing with a rack 16 on the contiguous end of the shaft. The shaft 14 extends rearwardly from the housing and has a handle 18 at its rear end.

The rack 16 is formed on a circular part of the rod and the teeth are long enough to permit turning of the housing 12 to conform to different slants of windshields and remain in mesh with the pinion 15 as the pinion shifts with the housing. The housing is here shown as secured to the windshield iron by a clamp 19 connected to the housing by screws 20, the clamp having a jaw 21 opposed to a fixed jaw 22 on the housing 12. The rod 9 is slid endwisely into position through the hollow arm 11 and into the housing 12 mounted on the arm 11.

The housing or support 5 is also formed with an upwardly extending plate 23 which is here shown as a segment of a disk, the plate 23 having a signal as the word "stop" thereon on the rear face thereof. The arm 11 is here shown as a tube and the housing 5 as formed by flattening or shaping the end of the tube and the end of the housing closed by a plug 24 and the plate 23 and plug 24 held in position by hollow rivets or screws 25 extending tranversely through the base portions of the plate 23, the housing 5 and the plug 24. Said rivets or screws are preferably located at diametrically opposite points of the axle 3. Owing to the construction of the housing or support 5, it is watertight and no shield enclosing the disks is necessary.

One of the disks as the rear disk 2 is also provided with a cutout 26 arranged to come into alinement with the signal plate 23.

The indicator plates 1, 2 are held in the position to which they are adjusted, it being understood that they are capable of assuming but four positions assumed, respectively, when the arrows point upwardly, to the right, the left and downwardly, by any suitable means as here shown as in impositive or friction locking means here shown as carried by the support.

As here illustrated, the rear disk is formed with sockets or depressions 27 in its rear fuses, said plate having four sockets, which sockets are arranged to come into and out of alinement with the hollow screw or rivets 25, and poppets or balls 28 are arranged in the rear of these screw or rivets 25, the poppets being pressed outwardly into the sockets 27 of the rear plate 2 by coiled springs 29 arranged in the rivets 25, the rivets being closed at the front ends to provide abutments for the front ends of the springs.

Each disk or plate 1, 2 is also formed with a small central axial offset or hub 30 to take up looseness between the support 5 and the plates. Usually, a lamp bracket 31 is also mounted on the arm, it being here shown as having a split hub or collar 32 on the arm and held in position by a clamping member 33.

It is obvious that owing to the bobbin like structure of the disks 1, 2 and their axle 3 and the slotted support 5, that these parts together with the actuating mechanism can be readily assembled, and further in that the arrangement of the spring pressed poppets coacting with depressions in one or both plates provides a particularly simple and efficient means for impositively locking the plates in any radial position and further in that owing to the circular teeth on the outer end of the rack member, the device readily conforms to windshields of different slants.

In use, the device is attached to one side of the windshield, preferably the left side, and extends laterally therefrom to the left side of the car so that the indicator plates 1, 2 extend in vertical planes extending transversely of the vehicle.

In operation, when the car is traveling straight ahead, the disks 1, 2 are turned by means of the handle 18 so that the arrows point upwardly. To turn to the right or to the left, the handle 18 is turned to the right or to the left, thus turning the disks so that the arrows point either to the right or to the left; and when it is desired to stop, the handle 18 is turned to rotate the disks so that the arrows point downwardly and carry the cutout in the plate 2 to expose the word "stop" to a stationary signal plate 23. In any of these positions, the spring pressed poppets arranged diametrically opposite each other, engage correspondingly located sockets on the opposing face of the rear indicator plate. The movement of the rod 9 is limited in either direction by striking against the plug 24 and the opposing wall of the housing 5. The portion of the rack or rod in the housing 5 is offset at 34 and the clearance between the ends of the offset portion and the plug 24 and opposing wall of the housing is sufficient to permit a half revolution in either direction when the arrow points up.

This direction indicator in so far as my present invention is concerned, is particularly advantageous in that it consists of a few parts which are simple in construction and which can quickly be assembled.

What I claim is:

1. A direction indicator for vehicles comprising forwardly and rearwardly facing indicator members, a rotatable axle on which the indicator members are fixed, a support arranged between said members and formed with a slot open at one end for receiving the axle through its open end, and actuating means extending across the open end of the slot and coacting with the axle to hold it from displacement, and to actuate it, substantially as and for the purpose described.

2. A direction indicator comprising oppositely facing substantially parallel indicator members, a rotatable axle on which the indicator members are fixed to rotate therewith, the axle having gear teeth on the intermediate portion thereof, a support extending between the indicator members and having a slot open at one end for receiving the axle, and a toothed member carried by the support, and closing the open end of the slot to hold the axle from displacement, said toothed member meshing with the teeth of the axle, and means for actuating the toothed member, substantially as and for the purpose set forth.

3. A direction indicator comprising oppositely facing substantially parallel indicator members, a rotatable axle on which the indicator members are fixed to rotate therewith, a support having a flattened hollow portion extending between the indicator members and having alined slots in its front and rear sides and in its bottom wall, these slots providing the support with a slot or a passage open at one end for receiving the axle, and a member located in the hollow portion and extending across the slot in the bottom of the support and thereby closing the open end of the slot or passage of the support and holding the axle therein, substantially as and for the purpose described.

4. A direction indicator comprising oppositely facing substantially parallel indicator members, a rotatable axle on which the indicator members are fixed to rotate therewith, a support having a flattened hollow portion extending between the indicator members and having alined slots in its front and rear sides and in its bottom wall, these slots providing said portion with a slot or passage open at one end for receiving the axle, and a member located in the hollow portion and extending across the slot in the bottom of the support and thereby closing the open end of the slot or passage of the support and holding the axle therein, the last mentioned member being connected to the axle, and means for moving said member to actuate the axle, substantially as and for the purpose specified.

5. A direction indicator comprising a unit in the form of a bobbin consisting of front and rear flanges forming front and rear background indicator plates, an axle fixed to the flanges, and a unit formed with a slot open at one end for receiving the intermediate part of the axle, and means associated by the latter unit and coacting therewith to rotate the former unit and to close the open end of the slot to hold the axle from displacement, substantially as and for the purpose described.

6. A direction indicator comprising rotatable front and rear plates, and an axle on which the plates are mounted, a support for the axle including a portion extending between the plate, and a spring pressed means carried by the support and pressing against the inner face of one of the plates, substantially as and for the purpose described.

7. A direction indicator comprising a support, a stationary signal plate mounted on the support, a rotatable indicator member having an axle journaled in the support and movable over the face of the stationary signal plate, and normally covering the same and having an opening arranged to be brought into alinement with the signal plate to expose the same, substantially as and for the purpose described.

8. A direction indicator comprising a support, including a hollow box like portion having an upwardly extending signal plate on the top thereof, indicator disks and an axle on which the disks are fixed, the axle being journaled in the support and extending transversely through the same whereby the disks are on front and rear sides of the support and the signal plate, one disk being formed with a cutout arranged to be brought into and out of alinement with the signal plate, and means for actuating the axle including a member extending into the housing, said member engaging the axle to rotate the same, substantially as and for the purpose specified.

9. A direction indicator comprising a support including a hollow boxlike portion formed with a slot open at one end extending inwardly from the lower side thereof, a signal plate carried by the boxlike portion, indicator disks and an axle on which the disks are fixed, the axle being arranged in the slot whereby the disks are on front and rear sides of the support and the signal plate, one disk being formed with a cutout arranged to be brought into and out of alinement with the signal plate, and means for actuating the axle including a member extending into the housing and across the open end of the slot, said member engaging the axle to rotate the same, and the axle being held from displacement out of the slot by said member, substantially as and for the purpose set forth.

10. A direction indicator comprising a support including a boxlike housing having a tubular shank, indicator members located in front and rear of the housing, an axle for said member journaled in the housing, and means for actuating the axle including a member extending into the housing through the shank thereof, substantially as and for the purpose described.

11. A direction indicator comprising a support in the form of a housing having a hollow arm extending laterally therethrough and provided with means for attachment to the vehicle, the support being formed with a slot open at one end extending inwardly from its lower side, a unit comprising front and rear indicator members, and an axle connecting said member, and the axle having its intermediate portion located in the slot and provided with gear teeth, a rod extending through the arm and into the housing and across the open end of the slot and having rack teeth meshing with the gear teeth of the axle, means for attaching the arm to a vehicle and means for actuating the rod, substantially as and for the purpose specified.

12. A direction indicator comprising a tubular supporting arm having a flattened end forming a housing, an axle journaled in the housing and extending transversely therethrough, indicator means carried by the axle, and means for rotating the axle extending through the tubular support means, and into the housing, substantially as and for the purpose described.

13. A direction indicator comprising a tubular supporting arm having a flattened end forming a housing and indicator plate carried by the flattened housing and lapping one side thereof, a hollow fastening member extending transversely through the housing and the plate, an axle journaled in the housing and extending transversely thereof, an indicator plate mounted on the axle and rotatable therewith, means for rotating the axle extending through the tubular supporting means and into the housing, and spring pressed means in the hollow fastening member and coacting with the plate to hold in the position it has been turned by the actuation of the axle, substantially as and for the purpose specified.

In testimony whereof, I have hereunto signed my name, at Syracuse, in the county of Onondaga, and State of New York, this 6th day of July, 1920.

GEORGE E. BATES.